(No Model.)
W. P. BETTENDORF.
METALLIC WHEEL.
No. 458,411. Patented Aug. 25, 1891.
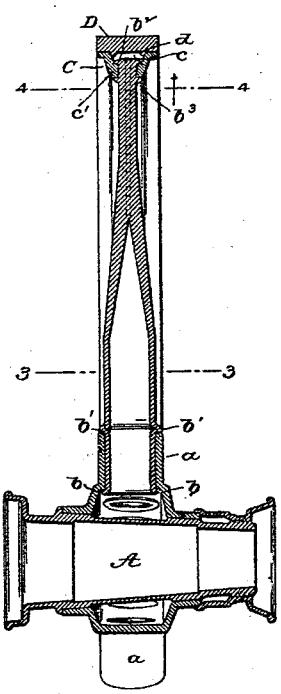
Fig. 1
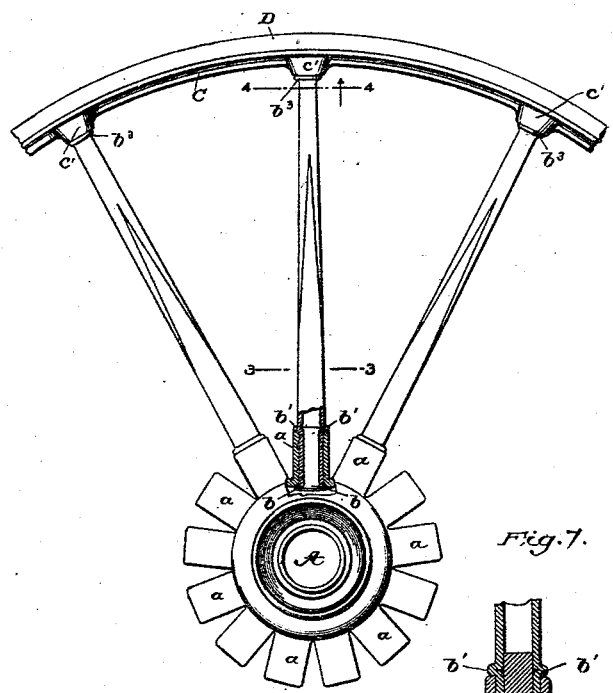
Fig. 2.
Fig. 7.
Fig. 3.
on line 3-3
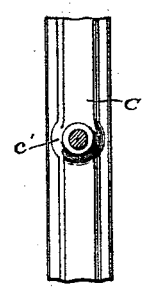
Fig. 4.
on line 4-4
Fig. 6.
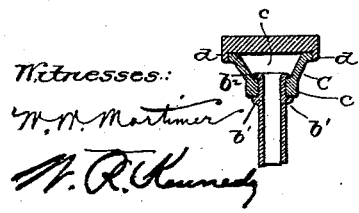
Fig. 5.
Witnesses:
W. W. Mortimer
W. R. Kennedy
Inventor:
W. P. Bettendorf
By his Atty.
Rich. T. Dodge

UNITED STATES PATENT OFFICE.

WILLIAM P. BETTENDORF, OF DAVENPORT, IOWA.

METALLIC WHEEL.

SPECIFICATION forming part of Letters Patent No. 458,411, dated August 25, 1891.

Application filed May 26, 1890. Serial No. 353,188. (No model.)

*To all whom it may concern:*

Be it known that I, WILLIAM P. BETTENDORF, of Davenport, in the county of Scott and State of Iowa, have invented certain Improvements in Metallic Wheels, of which the following is a specification.

The object of this invention is to provide a cheap, light, and strong metallic wheel adapted more particularly for use on wagons and carriages.

My wheel consists, essentially, of a metallic hub, tubular metallic spokes secured in mortises or sockets in the hub, a metal felly of peculiar form attached to the outer ends of the spokes, and a metal tire applied to the felly.

In the accompanying drawings, Figure 1 is a cross-section through one side of a wheel constructed in accordance with the invention. Fig. 2 is a side view of the same, partly in section. Fig. 3 is a cross-section on the line 3 3 of Figs. 1 and 2. Fig. 4 is a cross-section on the line 4 4 of Figs. 1 and 2, looking in the direction indicated by the arrow. Fig. 5 is a section through a portion of a wheel of slightly-different form. Fig. 6 is a view of a tube such as is used in the formation of the spokes. Fig. 7 is a view of a modification.

Referring to the drawings, A represents a metal hub, which is preferably cast complete in one piece of malleable iron or other suitable metal, with a series of radially-projecting spoke-receiving sockets *a*, each of which is open through the interior from its outer end to the central space of the hub. The form or configuration of the hub and its sockets is not of the essence of the invention, the only requirement being that the hub shall be a rigid one and that it shall present sockets or mortises adapted to permit the firm attachment of the spokes. The spokes are tapered or diminished in size from the inner to the outer ends and are of tubular form at the inner end. I commonly construct each spoke from a length of ordinary metal tubing, such as shown in Fig. 6, by passing the same between rolls or roller-dies, having their surfaces suitably formed to give the tube the tapering form and at the same time give it an elliptic form in cross-section at the larger end, as shown in Fig. 3. The effect of thus reducing and tapering the tube is to produce a spoke of tapering form, the inner or larger end of which is tubular and of elliptic form, while the outer end is solid, or substantially so, and of circular form in cross-section. It will be observed that the walls of the spoke increase in thickness from the inner toward the outer end.

The tapering operation may be carried so far as to produce a spoke the outer end of which is solid or imperforate, or the operation may be such as to leave a slight central opening through the outer end, as indicated in dotted lines in Figs. 1 and 3. The existence or non-existence of this opening at the outer end is unimportant, and in the practical manufacture of the spokes it will be found that owing to variations in the thickness of the tubing and other causes the spokes will under the same treatment present in some cases the central opening and in other cases a solid end.

Each spoke has its inner end inserted into one of the mortises or sockets of the hub and secured firmly therein. I commonly force the spoke outward radially at its extreme inner end to produce a lip or shoulder *b* to engage against the inner surface of the hub and prevent the spoke from being withdrawn. I also expand the spoke radially at the outer end of the socket or mortise in such manner as to produce a circumferential shoulder or enlargement *b'*, which rests firmly against the outer end of the socket to prevent the spoke from being driven inward. The enlargement *b'* may be formed by forcing the metal of the spoke outward from the interior, as shown in Fig. 1; or it may be produced by upsetting the spoke endwise, so as to produce a solid shoulder or enlargement on the outside, as indicated by the dotted lines in the same figure and in full lines in Fig. 5.

As an additional means of securing the spoke in place, it is proposed to weld the same firmly to the receiving-socket. The heating of the parts to this end may be effected by a suitable gas-furnace or by electric-heating devices such as are now known in the art, and the pressure or the blows necessary to effect the union of the parts may be produced by pressure devices or power-driven hammers of any appropriate character.

While it is advantageous in most cases to use spokes the walls of which increase in thickness toward the outer end, it is in other cases, and especially for light wheels, advantageous to use tapered tubular spokes the walls of which are of uniform or substantially uniform thickness from the inner to the outer end, as shown in Fig. 5. Obviously the sectional form of the spokes both at the inner and the outer ends may be varied at will. At the outer end each spoke is inserted through a felly C, which is preferably rolled complete in one piece from soft steel or iron. This felly is channeled longitudinally in its outer face, as shown at $c$, and is provided at suitable intervals with hollow bosses $c'$, perforated to receive the ends of the spokes, which are inserted therethrough and secured by heading down their outer ends, as shown at $b^2$, and by enlarging them radially to form shoulders $b^3$, which bear against the inner face of the felly—that is to say, against the face nearest the hub on the wheel. I also propose to weld the outer ends of the spokes into the felly, and when this is done the head $b^2$ and shoulder $b^3$, or either of them, may be omitted. For various reasons it is preferred, however, to retain the head and shoulder.

It will be observed that the heads on the ends of the spokes are seated within the felly below its outer surface. This permits the use of a flat metal tire D, which is seated tightly around and upon the felly. In order to prevent lateral displacement of this tire it is provided with lips or shoulders $d$ to engage the inner walls of the felly, as shown in Fig. 1. Instead, however, of placing these lips on the inside, the tire may be made of greater width than felly and the lips $d$, formed at the edges of the tire and adapted to engage the outer edges of the felly, as shown in Fig. 5.

In some cases I propose to introduce into the inner ends of the spokes plugs or filling-pieces, as shown at E, Fig. 7, to hold the spokes outward in intimate contact with the walls of the mortise. These may be welded in place or otherwise secured.

Having thus described my invention, what I claim is—

1. The metallic hub provided with sockets or mortises, in combination with the metal spokes having tubular inner ends inserted in said mortises and provided with circumferential enlargements at the inner and outer ends of the mortise to resist end motion.

2. The tubular tapered metal spoke having near one end a shoulder $b'$, formed by metal carried outward beyond the body portion, as shown.

3. A metallic spoke having its walls of increasing thickness from the inner toward the outer end.

4. A metallic spoke having a tubular inner end and a solid or substantially solid outer end.

5. A tapered metallic spoke having its larger end of tubular form and flattened cross-section and its opposite end of solid or substantially solid form and circular cross-section.

6. In combination with the metal tire, the longitudinally-channeled metal felly provided with the hollow perforated bosses, and the metal spokes inserted through the bosses and enlarged on both sides of the same.

7. The metallic felly having the longitudinal channel and the perforated bosses $c'$.

In testimony whereof I hereunto set my hand, this 8th day of May, 1890, in the presence of two attesting witnesses.

WILLIAM P. BETTENDORF.

Witnesses:
F. STANLY ELMORE,
W. R. KENNEDY.